Nov. 25, 1924. 1,517,164

M. F. LEAR

SCRUBBING PAIL

Filed March 30, 1922

Inventor,
Melchor F. Lear,
By Bates P. Macklin,
Attys

Patented Nov. 25, 1924.

1,517,164

UNITED STATES PATENT OFFICE.

MELCHOR F. LEAR, OF DENVER, COLORADO.

SCRUBBING PAIL.

Application filed March 30, 1922. Serial No. 548,231.

*To all whom it may concern:*

Be it known that I, MELCHOR F. LEAR, a citizen of the United States, residing at Denver, in the county of Denver and State of Colorado, have invented a certain new and useful Improvement in a Scrubbing Pail, of which the following is a full, clear, and exact description, reference being had to the accompanying drawings.

This invention relates to water pails and particularly to those which are provided with two compartments, one being used for cleansing and the other for rinsing water.

An object of my invention is the provision of a pail wherein the two compartments have a common spout; also wherein the position of the bail is such that the pail may be carried conveniently, independently of whether or not equal quantities of water are in both compartments.

Other features include the provision of a removable container which may be hooked over the side of the pail for providing receptacles on either side of a partition for holding soap, or cleansing material in container form.

The means for carrying out the above objects will be fully set forth in the following description which pertains to the drawings, and the essential features will be summarized in the claim.

Figure 1:
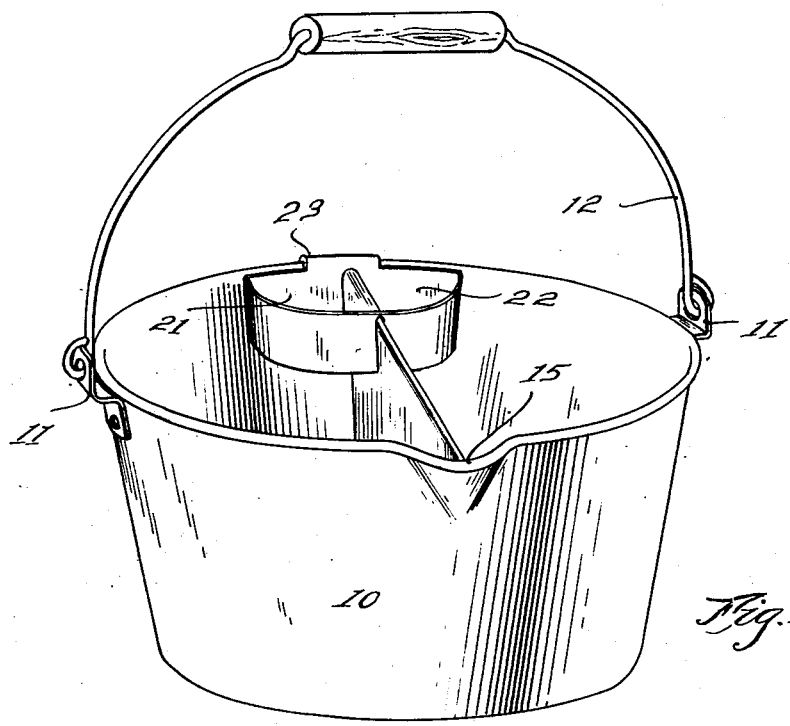
Figure 2:
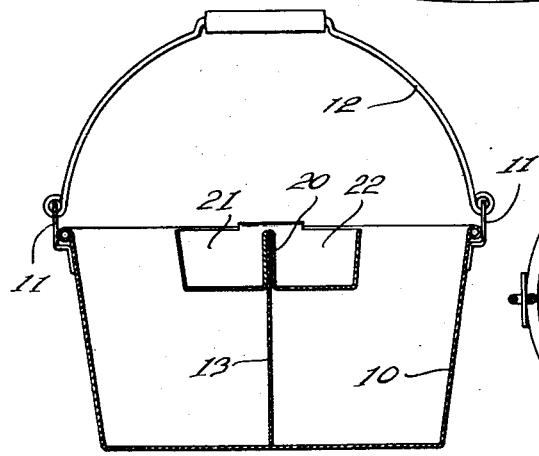
Figure 3:
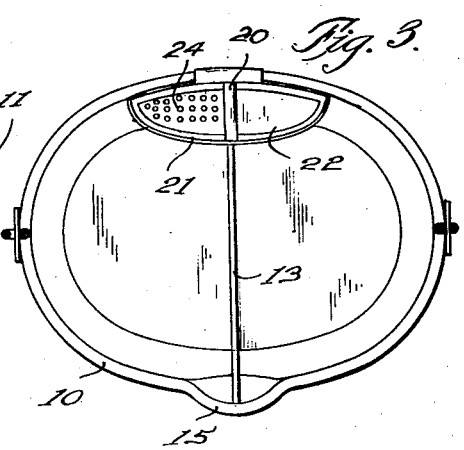
Figure 4:

In the drawings, Fig. 1 is a perspective view of a pail constructed according to my invention; Fig. 2 is a vertical section taken longitudinally through the pail; Fig. 3 is a plan view showing the pail in section; and Fig. 4 is a perspective view of the container removed from the pail.

Designating the parts shown in the drawing by use of reference characters, 10 indicates the body of a pail having ears 11 which are adapted to receive and support a bail 12. As shown in the drawings, the pail is elliptical in shape and is divided on the minor axis by a partition 13 which forms two compartments, each of which is water tight with reference to the other. The bail spans the partition and extends across the major axis of the ellipse, thus enabling the pail to be suspended in up-right position, independently of the quantity of water held in either compartment.

In Figs. 1 and 3 the pail is shown as having a spout 15 adjacent one side of the partition. This spout is common to both compartments and enables the contents of either to be emptied without allowing it to spill over the partition.

My invention provides for a container which is useful in holding soap or brushes, and to this end I have shown a receptacle adapted to be removably positioned on the pail. In the form illustrated, the receptacle is provided with a dividing wall 20 which extends over the partition and divides it into two compartments, 21 and 22. If desired, the receptacle may be equipped with a hooked portion, as at 23, for engaging the top of the pail and thereby preventing the receptacle from sliding down toward the spout when the contents are being emptied therefrom. The bottom of one of the compartments may be perforated, as at 24, for draining purposes, and for rendering the compartment suitable for holding soap.

In view of the foregoing description, it will be seen that a pail constructed according to my invention may be readily retained on the top of a step ladder or on a narrow window sill by reason of the elliptical construction. Further advantages are that the arrangement of the bail with reference to the dividing partition enables the pail to be carried in an up-right position without spilling the contents even though water is carried in only one compartment; and that the arrangement of the spout facilitates the emptying of the pail without splashing the contents upon the user.

Having thus described my invention I claim:

In combination, a pail having a partition dividing the pail into two water-tight compartments and a removable container having a recess in its bottom seating over the partition and being provided with a rim engaging hook whereby the partition and the brim of the pail serve to hold the container in place.

In testimony whereof, I hereunto affix my signature.

MELCHOR F. LEAR.